(12) United States Patent
Cilingir et al.

(10) Patent No.: US 11,017,781 B2
(45) Date of Patent: May 25, 2021

(54) REVERBERATION COMPENSATION FOR FAR-FIELD SPEAKER RECOGNITION

(71) Applicant: INTEL CORPORATION, Santa Clara, CA (US)

(72) Inventors: Gokcen Cilingir, Santa Clara, CA (US); Narayan Biswal, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/153,756

(22) Filed: Oct. 6, 2018

(65) Prior Publication Data

US 2019/0279645 A1  Sep. 12, 2019

Related U.S. Application Data

(63) Continuation of application No. 15/242,882, filed on Aug. 22, 2016, now Pat. No. 10,096,321.

(51) Int. Cl.
*G10L 15/00* (2013.01)
*G10L 15/16* (2006.01)
*G10L 17/04* (2013.01)
*G10L 17/12* (2013.01)
*G10L 17/20* (2013.01)
(Continued)

(52) U.S. Cl.
CPC ............. *G10L 17/04* (2013.01); *G10L 17/06* (2013.01); *G10L 17/12* (2013.01); *G10L 17/20* (2013.01); *G10L 21/0208* (2013.01); *G10L 2021/02082* (2013.01)

(58) Field of Classification Search
None
See application file for complete search history.

(56) References Cited

U.S. PATENT DOCUMENTS 6,556,969 B1 * 4/2003 Assaleh ................. G10L 17/00
704/243
7,856,353 B2  12/2010 Fukuda et al.
(Continued)

OTHER PUBLICATIONS

United States Patent and Trademark Office, "Non-Final Office Action," issued in connection with U.S. Appl. No. 15/242,882, dated Jan. 12, 2018, 10 pages.
(Continued)

*Primary Examiner* — Satwant K Singh
(74) *Attorney, Agent, or Firm* — Hanley, Flight & Zimmerman, LLC

(57) ABSTRACT

Techniques are provided for reverberation compensation for far-field speaker recognition. A methodology implementing the techniques according to an embodiment includes receiving an authentication audio signal associated with speech of a user and extracting features from the authentication audio signal. The method also includes scoring results of application of one or more speaker models to the extracted features. Each of the speaker models is trained based on a training audio signal processed by a reverberation simulator to simulate selected far-field environmental effects to be associated with that speaker model. The method further includes selecting one of the speaker models, based on the score, and mapping the selected speaker model to a known speaker identification or label that is associated with the user.

22 Claims, 8 Drawing Sheets

(51) Int. Cl.
*G10L 21/0208* (2013.01)
*G10L 17/06* (2013.01)

(56) References Cited

U.S. PATENT DOCUMENTS

| | | | |
|---|---|---|---|
| 9,286,863 B2 | 3/2016 | Moon | |
| 9,449,613 B2* | 9/2016 | Peters | G10L 25/51 |
| 9,607,627 B2 | 3/2017 | Liang et al. | |
| 9,865,265 B2* | 1/2018 | Ramprashad | G10L 15/20 |
| 10,013,981 B2* | 7/2018 | Ramprashad | G10L 15/20 |
| 10,049,658 B2* | 8/2018 | Pinto | G10L 15/07 |
| 10,096,321 B2* | 10/2018 | Cilingir | G10L 17/20 |
| 10,304,462 B2* | 5/2019 | Ramprashad | G10L 15/20 |
| 10,391,636 B2* | 8/2019 | Breazeal | B25J 9/0003 |
| 10,614,812 B2* | 4/2020 | Ramprashad | G10L 15/32 |
| 10,872,602 B2* | 12/2020 | Nosrati | H04R 3/04 |
| 2008/0071540 A1 | 3/2008 | Nakano et al. | |
| 2013/0163787 A1 | 6/2013 | Moon | |
| 2015/0301796 A1* | 10/2015 | Visser | G06F 3/167 |
| | | | 715/728 |
| 2015/0302856 A1* | 10/2015 | Kim | G10L 17/22 |
| | | | 704/273 |
| 2015/0314454 A1* | 11/2015 | Breazeal | B25J 9/0003 |
| | | | 700/259 |
| 2016/0086609 A1* | 3/2016 | Yue | G10L 17/02 |
| | | | 704/239 |
| 2016/0171979 A1* | 6/2016 | Breazeal | B25J 11/0015 |
| | | | 704/9 |
| 2016/0193732 A1* | 7/2016 | Breazeal | B25J 9/1694 |
| | | | 700/258 |
| 2017/0278519 A1* | 9/2017 | Visser | G10L 19/002 |
| 2018/0082692 A1 | 3/2018 | Khoury et al. | |

OTHER PUBLICATIONS

United States Patent and Trademark Office, "Notice of Allowance," issued in connection with U.S. Appl. No. 15/242,882, dated May 21, 2018, 8 pages.

Akula et al., "Compensation for room reverberation in speaker identification", 16th European Signal Processing Conference, Aug. 25-29, 2008, 5 pages.

* cited by examiner

Recognition Circuit
204

REVERBERATION COMPENSATION FOR FAR-FIELD SPEAKER RECOGNITION

This application is a continuation of U.S. application Ser. No. 15/242,882 filed Aug. 22, 2016 (now U.S. Pat. No. 10,096,321), which is herein incorporated by reference in its entirety.

BACKGROUND

Speaker recognition systems are typically trained to recognize and identify the voices of a number of users who are enrolled in the system. As will be appreciated, therefore, a speaker as used herein refers to a person. During the enrollment process, a user will generally utter a few words into a microphone which captures the audio for use in building a speaker model. In most practical enrollment scenarios the user is in close proximity to the microphone. During subsequent operation of the recognition system, however, the speaker may be located further away from the microphone. For example, speakers may be seated around a large conference table with a central microphone, or a user may be speaking from a distance to a "smart home" controller device that responds to audio commands. Because training typically occurs in the near-field of the microphone, while later operational usage (e.g., authentication) may occur in the far-field of the microphone, recognition performance may be degraded and may be unusable in some circumstances depending on the audio environment. This is due, at least in part, to the fact that the sound can be reflected off walls and other objects which distorts the signal when captured from a distance.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
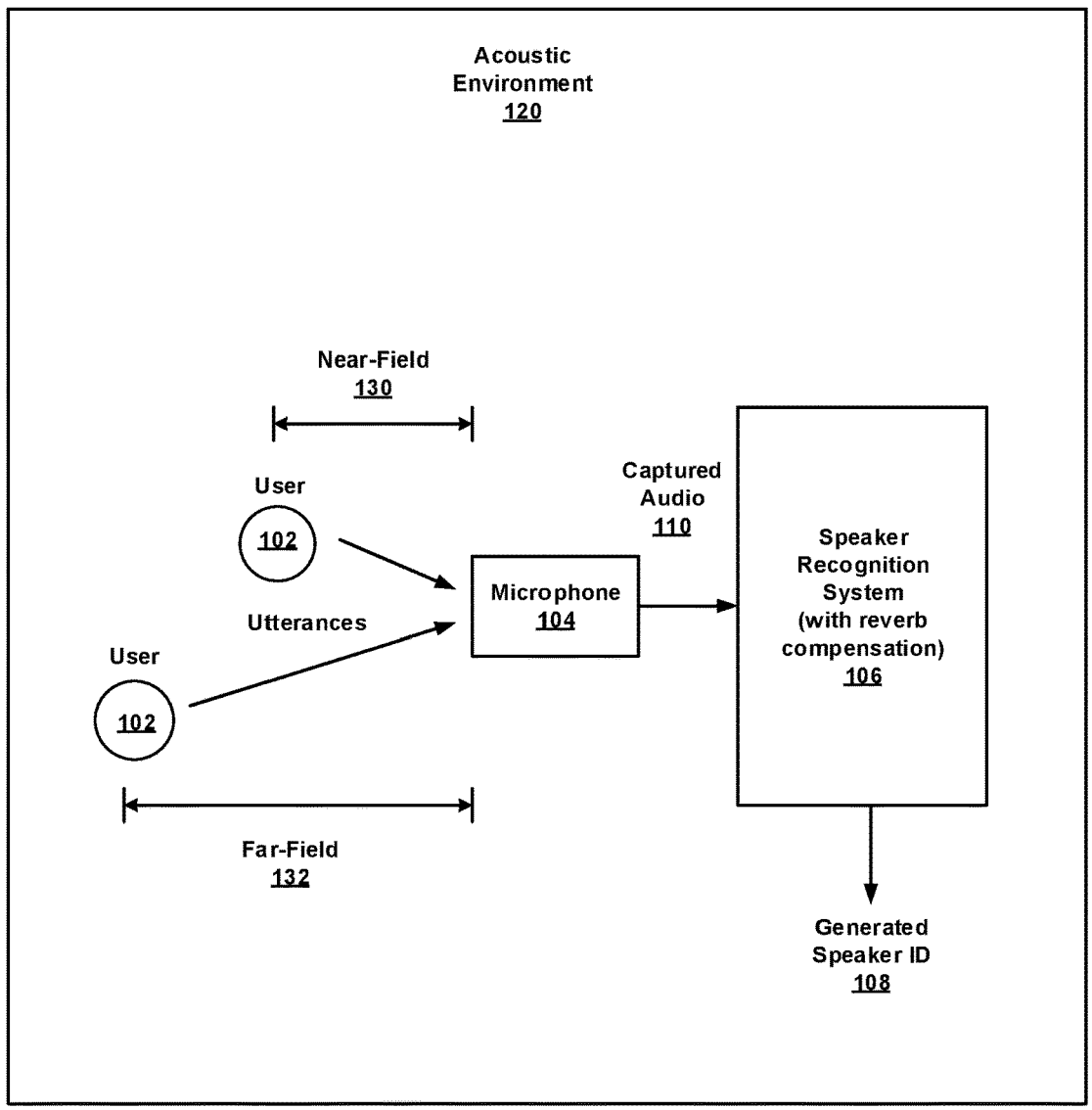
FIG. 1 is a top level diagram of an implementation of a system for speaker recognition with reverberation compensation, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for speaker recognition from captured audio, regardless of whether the audio is captured in the near-field or the far-field of a microphone. When audio is captured in the far-field, typically greater than about three feet from the microphone, various environmental effects, including reflections from walls and object surfaces, can distort the audio. This distortion, which is also referred to as reverberation, can vary in character from one room or environment to the next, and can also vary with changing distances between the user and the microphone in any given environment. In order for speaker recognition systems to be effective, they must generally be trained for each user and the characteristics of the training and authentication audio signals should match. This is not the case, however, in the typical usage scenario where training is performed in the near-field and authentication is performed in the far-field. The disclosed techniques improve speaker recognition performance through the use of reverberation compensation to simulate and adjust for mismatches between training and authentication signals due to far-field environmental effects resulting, for example, from varying distances between the user and the microphone, whether in the near-field or the far-field. Capabilities are provided to train and operate a reverberation compensated speaker recognition system and to configure a reverberation simulator for use in such a system, tailored to a particular environment.

In accordance with an embodiment, the disclosed techniques can be implemented, for example, in a computing system or an audio processing system, or a software product executable or otherwise controllable by such systems. The system or product is configured to receive an audio signal associated with speech of a user, extract features from that audio signal, and score the results of application of one or more speaker models to the extracted features. Each of the speaker models is trained based on a training audio signal from a known user, typically captured in a near-field of a microphone, and processed by a reverberation simulator to simulate selected far-field environmental effects to be associated with that speaker model (and corresponding user). The system is further configured to select one of the speaker models, based on the score, and map the selected speaker model to a known speaker identification or label that is associated with the user. Thus, the models effectively allow a far-field speaking person in a given room or environment to be identified, because the model effectively represents what that person's voice sounds like when it is encumbered by reverberation. Said differently, by matching a known user model to a sample of far-field speaker utterances, that far-field speaker can be assumed to be the person for which that model was made.

The techniques described herein may allow for improved speaker recognition, compared to existing methods that fail to account for far-field environmental effects that can distort the captured audio, according to an embodiment. Additionally, these disclosed techniques do not require pre-processing of the captured audio to eliminate reverberation, which can also remove useful information in the speech signal. The disclosed techniques can be implemented on a broad range of computing and communication platforms, including mobile devices, since the techniques do not require expensive far-field microphones or specialized microphone configurations. These techniques may further be implemented in hardware or software or a combination thereof.

FIG. 1 is a top level diagram 100 of an implementation of a system for speaker recognition with reverberation compensation, configured in accordance with certain embodiments of the present disclosure. A speaker recognition system 106 is shown to be located in an acoustic environment 120, such as a conference room, office, home living room, etc. The recognition system 106 is configured to perform reverberation compensation for improved recognition performance, in accordance with an embodiment of the disclosed techniques. A speaker or user 102 of the system produces speech, for example, in the form of utterances of words, which are captured by microphone 104. The user 102 may be relatively close to the microphone, for example in the near-field 130, or may be relatively far from the microphone, at any distance in the far-field 132. In some embodiments, the distance threshold separating near-field from far-field may be approximately three feet. The captured audio 110 is provided from the microphone 104 to the speaker recognition system 106, which generates a speaker ID or other label that identifies the user 102 as one of a number of known speakers, for which the system was trained to recognize.

Figure 2:
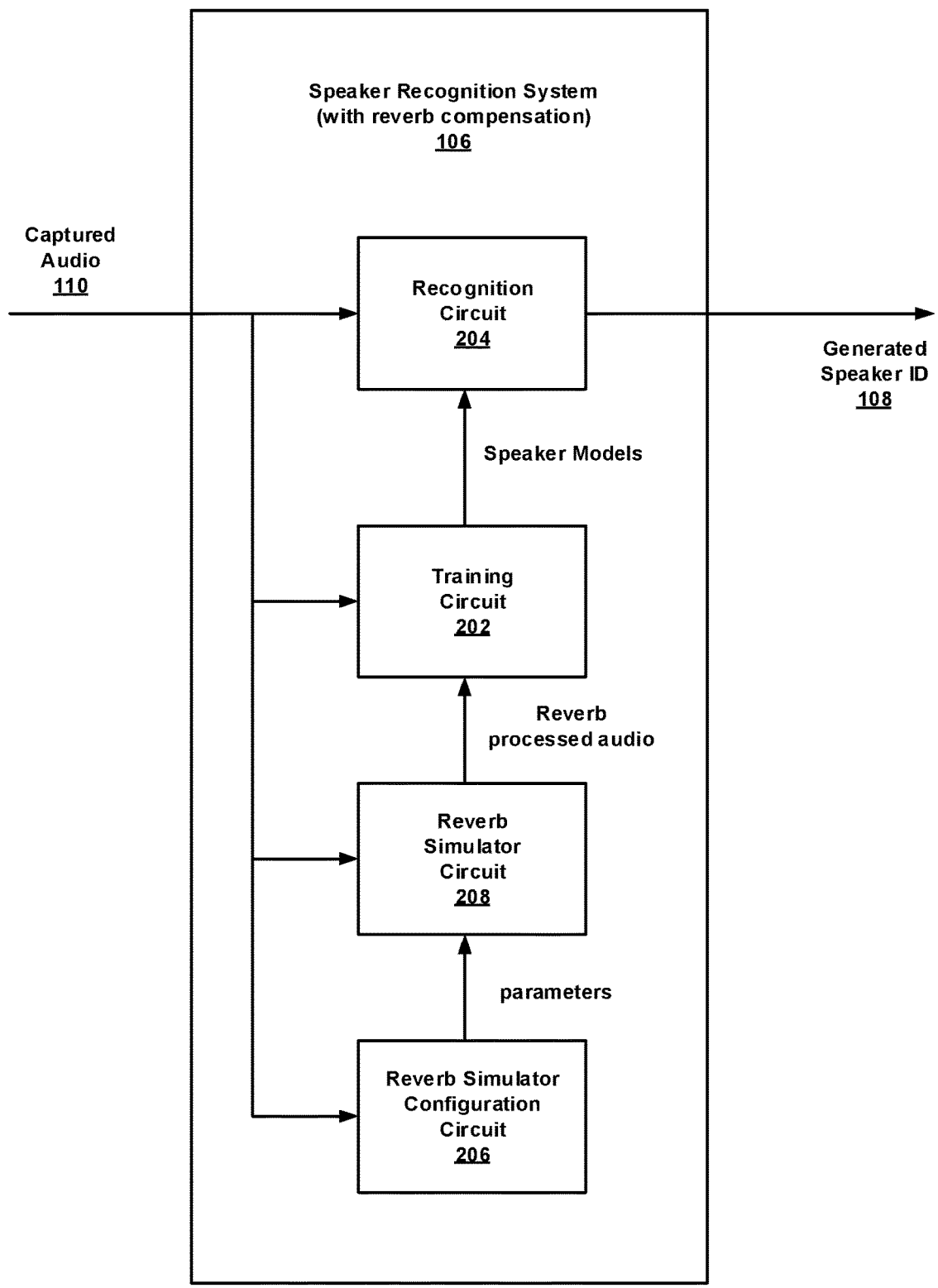
FIG. 2 is block diagram of a speaker recognition system with reverberation compensation, configured in accordance with certain embodiments of the present disclosure.

FIG. 2 is block diagram of a speaker recognition system 106 with reverberation compensation, configured in accordance with certain embodiments of the present disclosure. The speaker recognition system 106 is shown to include a recognition circuit 204, a training circuit 202, a reverberation simulator circuit 208, and a reverberation simulator configuration circuit 206, the operations of which will be explained in greater detail below in connection with the following figures. At a high level, however, the reverberation simulator circuit 208 is configured to generate a number of processed audio signals, based on the captured audio signal 110, to which varying types of reverberation have been applied. Each reverberation processed audio signal is intended to model different far-field effects of a particular acoustic environment 120. The training circuit 202 is configured to generate a number of speaker recognition models, for example during a training or user enrollment mode of the system. One of the models is based on a training audio signal, typically, but not necessarily, captured in the near-field. The other models are based on the reverberation processed versions of the training signal, which simulate far-field effects applied to the training signal. The recognition circuit 204 is configured to recognize the speaker's voice, during an operational (also referred to as authentication) mode of the system, and identify the speaker using the speaker recognition models provided by the training circuit, thus enabling recognition of speech from either near-field or far-field. The reverberation simulator configuration circuit 206 generates configuration parameters to control the reverberation characteristics that will be applied to the training signal to improve the simulation of far-field effects.

Figure 3:
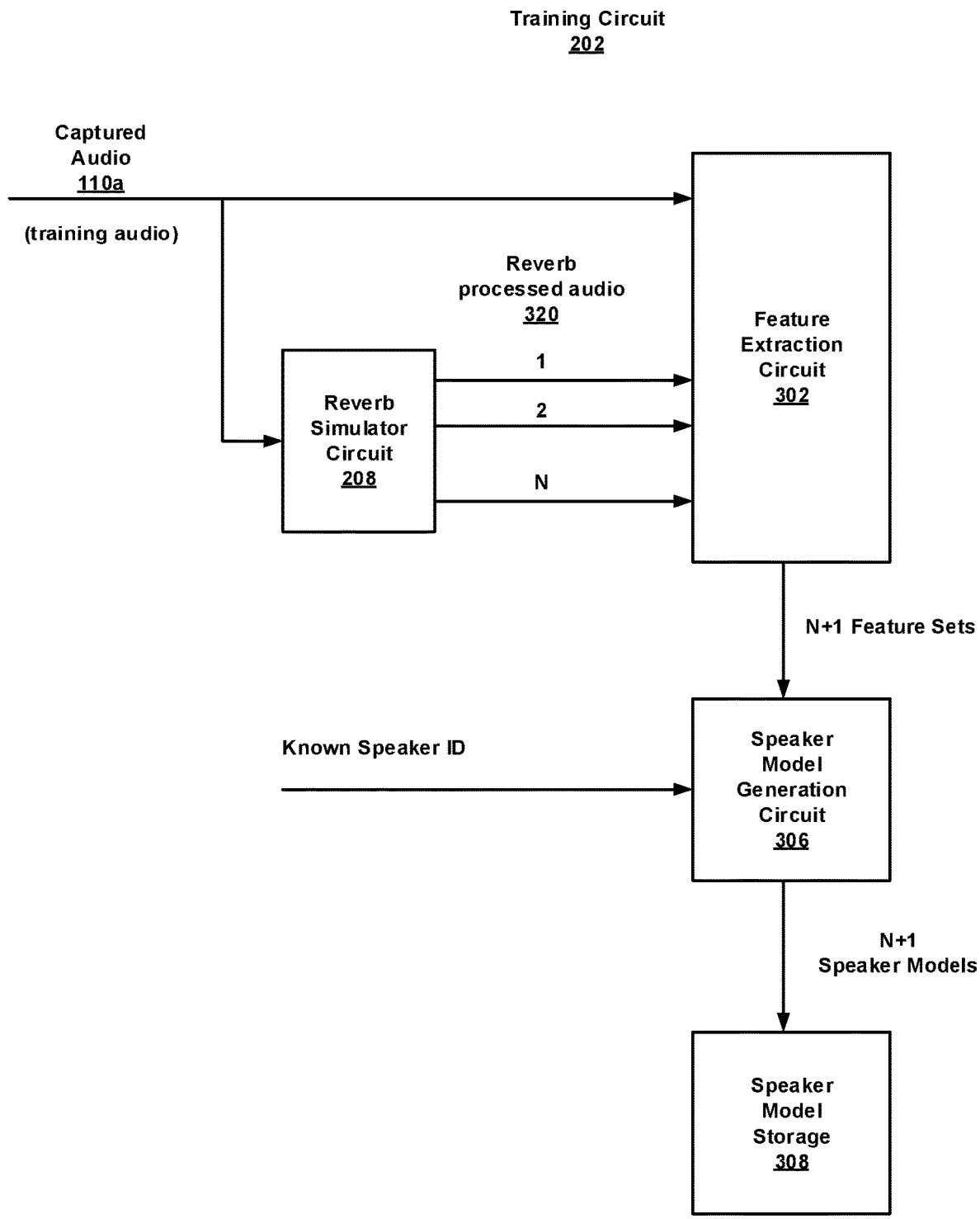
FIG. 3 is a more detailed block diagram of a training circuit, configured in accordance with certain embodiments of the present disclosure.

FIG. 3 is a more detailed block diagram of a training circuit 202, configured in accordance with certain embodiments of the present disclosure. The training circuit 202 is shown to include the reverberation simulator circuit 208, a feature extraction circuit 302, a speaker model generation circuit 306, and speaker model storage 308. Users of the speaker recognition system 106 (e.g., people who will later be identified by their speech) are enrolled in the system through a process that trains speaker models to their voice. During the training process, each user speaks a few words or phrases, referred to as training audio 110a, into a microphone. The training audio is spoken at a relatively close range to the microphone, typically such that the audio is captured within the near-field of the microphone, although this is not required so long as the training audio is captured at a closer distance than the subsequent authentication audio.

The reverberation simulator circuit 208 is configured to generate one or more (N) processed training audio signals 320 by applying reverberation effects to the captured training audio signal 110a. The reverberation effects that are applied to each of the processed training audio signals are generated to simulate far-field environmental acoustic effects. For example, each of the N processed training audio signals may comprise a unique acoustic effect that is associated with a particular spatial relationship between the speaker and the microphone and the characteristics of the room. In other words, each of the N processed signals 320, simulates enrollment conditions as though the speaker were located at a greater distance from the microphone. In some embodiments, the reverberation simulator circuit 208 may be a Schroeder reverberator and may be configured by adjusting any number of reverberation parameters, as will be described in greater detail below. In some embodiments, the reverberation simulator circuit 208 may use other known techniques in light of the present disclosure.

The feature extraction circuit 302 is configured to generate a set of extract features for the captured training audio signal 110a and for each of the processed training audio signals 320. So, for example, there can be N+1, sets of extracted audio features. The features may be any types of acoustic features of speech that can be used to distinguish between speakers. Such features may include, for example, pitch, spectral-based features, linear prediction based features, cepstral coefficients, and other behavioral and anatomical based features.

The speaker model generation circuit 306 is configured to generate a number of speaker models, each model associated, for example, with the speaker ID for the user being enrolled. Each of the speaker models may be based on one of the (N+1) feature sets. Speaker model generation may be performed using known techniques in light of the present disclosure.

Assuming there are K known and enrolled speakers, there may thus be K*(N+1) generated speaker models. The enrollment or training process for each speaker may be performed separately, and typically, though not necessarily, at different times. Speaker model storage 308 is configured to store these K*(N+1) speaker models for subsequent use by, for example by recognition circuit 204, as will be described below.

Figure 4:
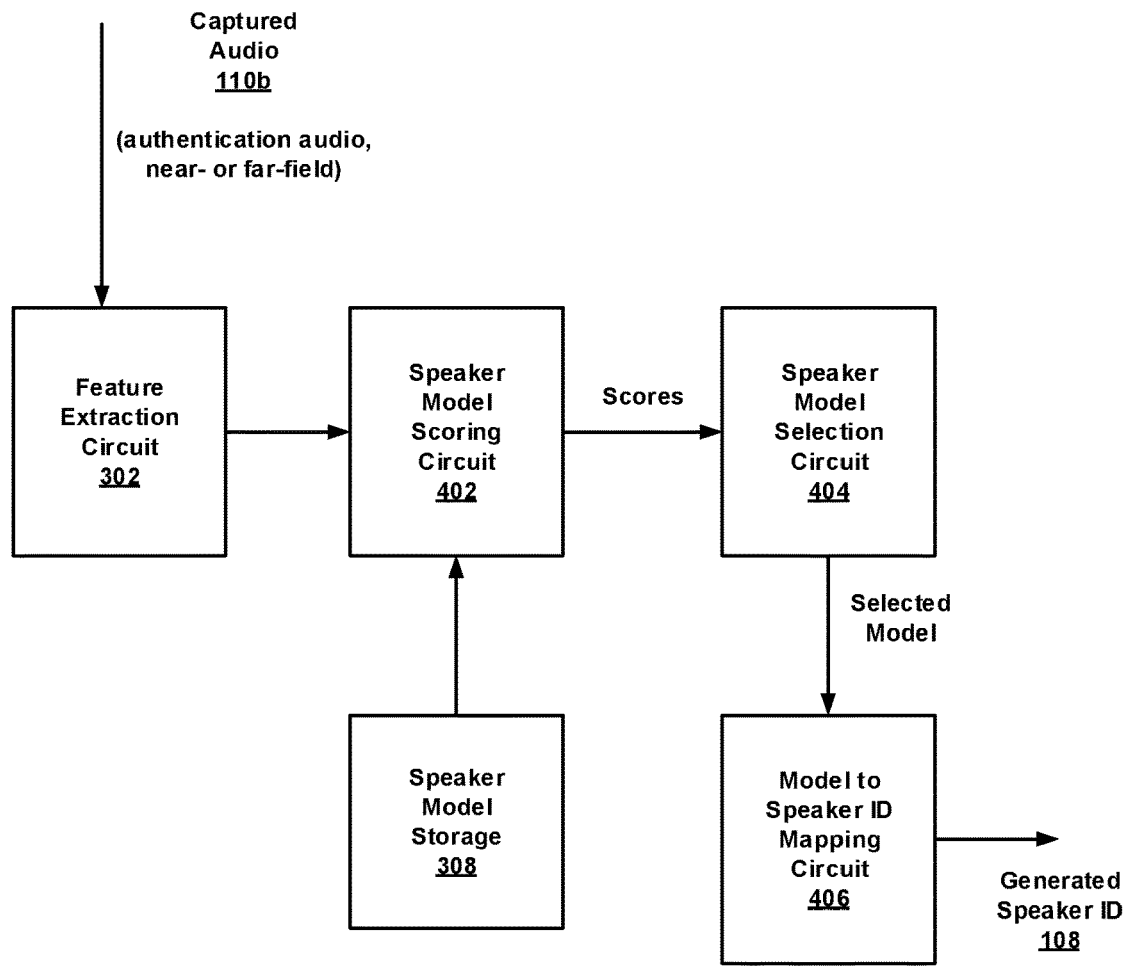
FIG. 4 is a more detailed block diagram of a recognition circuit, configured in accordance with certain embodiments of the present disclosure.

FIG. 4 is a more detailed block diagram of a recognition circuit 204, configured in accordance with certain embodiments of the present disclosure. The recognition circuit 204 is shown to include the feature extraction circuit 302, a speaker model scoring circuit 402, a speaker model selection circuit 404, a model to speaker ID mapping circuit 406, and speaker model storage 308. During authentication mode, as opposed to the training mode described above, the system 106 attempts to identify an unknown user based on a sample of their speech. The speech sample, captured audio 110b, may be captured from either the near-field or the far-field of the microphone 104. The user may or may not be enrolled in the system. If the user is enrolled, the system may identify the user by the speaker ID provided during training. In some embodiments, if the user is not enrolled, the system may indicate that the user is not identified.

The feature extraction circuit 302 is configured to extract features from the captured audio 110*b*, also referred to as an authentication audio signal, associated with speech of a user to be identified. In some embodiments, feature extraction circuit 302 may be shared with the feature extraction circuit 302 used in the training circuit 202. In some embodiments, feature extraction circuit 302 may be implemented as a separate circuit or module. In either case feature extraction circuit 302 is configured to extract acoustic features of speech that can be used to distinguish between speakers.

The speaker model scoring circuit 402 is configured to apply one or more of the speaker models, for example from speaker model storage 308, to the extracted features, and to score the results for each application. Speaker models that were trained on audio, which more closely simulates the environment in which the authentication audio 110*b* was captured, can be expected to produce higher scores. The speaker model selection circuit 404 is configured to select one of the speaker models based on the scores. For example, in some embodiments, the speaker model that is associated with the highest score is selected. As will be appreciated, however, other embodiments may employ some other selection criterion that is statistically relevant for a given application, such as the model associated with the penultimate score or the model associated with the score within a certain established range (and not necessarily the highest score). The selected model is passed to the speaker ID mapping circuit 406, which is configured to map the selected speaker model (e.g., the one with the highest score) to the known speaker ID associated with that model. Once the speaker ID is known, the actual speaker can thus be identified.

Figure 5:
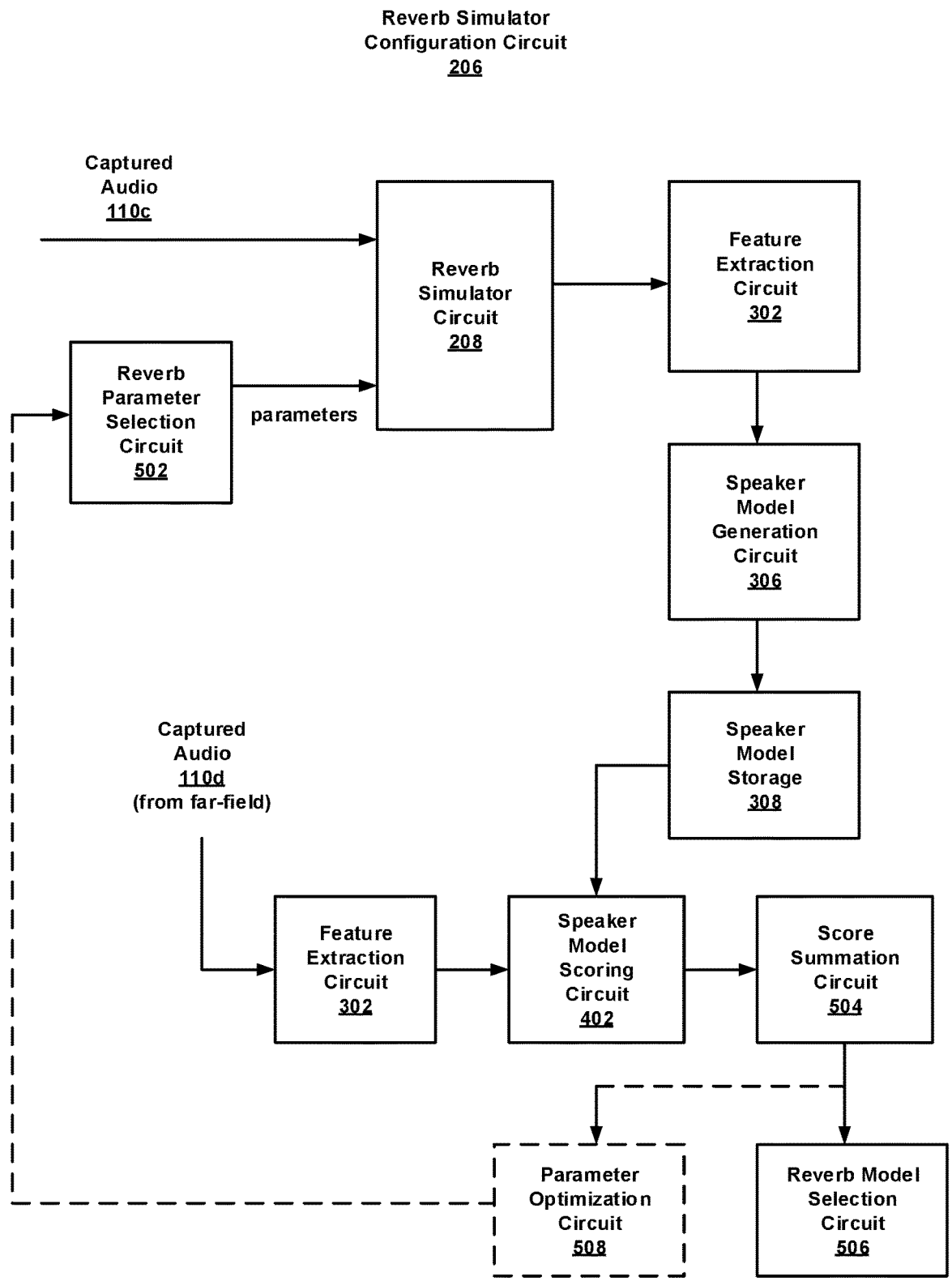
FIG. 5 is a more detailed block diagram of a reverberation simulator configuration circuit, configured in accordance with certain embodiments of the present disclosure.

FIG. 5 is a more detailed block diagram of a reverberation simulator configuration circuit 206, configured in accordance with certain embodiments of the present disclosure. The reverberation simulator configuration circuit 206 is shown to include, a reverberation parameter selection circuit 502, the reverberation simulator circuit 208, the feature extraction circuit 302, the speaker model generation circuit 306, speaker model storage 308, the speaker model scoring circuit 402, a score summation circuit 504, a reverberation model selection circuit 506, and a parameter optimization circuit 508. The reverberation simulator configuration circuit 206 is configured to select one or more sets of reverberation parameters such that the reverberation simulator circuit generates reverberation that most closely simulates a variety of far-field environmental acoustic effects that are associated with the room or environment in which speaker recognition is to be performed.

The reverberation parameter selection circuit 502 is configured to select an initial trial set of reverberation parameters from a population of trial parameter sets. A parameter set may include, for example, an effect mix parameter, a room size parameter, a damping parameter, and a stereo width parameter. Other known reverberation parameters, in light of the present disclosure, may also be included. The population of trial parameter sets may encompass a range of possible values for reverberation parameters of interest. As a simplified example, if there are four parameters of interest, and each parameter can be represented by a value in a continuous range between 0 and 1, then the population may include 4-valued tuples with each parameter chosen at a fixed increment over the possible range of values. If the increment is chosen as 0.5, then the values would be 0, 0.5, and 1 for each parameter, and there would be 81 possible tuples (3×3×3×3).

A first audio signal 110*c*, that includes user speech, is obtained. This may be the training audio data 110*a* that was captured and stored at an earlier time, for example, during the enrollment process. The reverberation simulator circuit 208 is configured to add reverberation to that signal, based on the current trial parameter set, to generate a processed audio signal that simulates a far-field environmental effect. The feature extraction circuit 302 is configured to extract features from the processed audio signal, and the speaker model generation circuit 306 is configured to generate a reverberation compensated speaker model based on the extracted features, as previously described for the training and recognition modes. In some embodiments, the speaker model may be stored in speaker model storage 308 for the duration of the reverb simulator configuration.

One or more additional audio signals 110*d* are captured from a variety of locations, all in the far-field of the microphone, or at least at a greater distance from the microphone than from where the first audio signal 110*c* was captured. These additional audio signals include speech from the same user that produced the first audio signal 110*c*. In some embodiments, facial detection or other identity verification techniques may be employed to ensure that the same speaker is providing audio signals 110*c* and 110*d*. The feature extraction circuit 302 is further configured to extract features from each of these additional audio signals 110*d*. The speaker model scoring circuit 402 is configured to score results of application of the generated speaker model to the extracted features of each of the additional audio signals 110*d*.

In some embodiments, this process may be repeated for multiple users. For example, near-field audio 110*c* and far-field audio 110*d* may be captured from a second user, a third user, etc. For each user, a reverberation compensated speaker model is generated and its performance against the far-field audio 110*d* is scored.

The score summation circuit 504 is configured to associate a summation of the scores (possibly from multiple users) with the current trial set of reverberation parameters. The score summation may indicate the effectiveness of the trial set of parameters at modelling the far-field effects captured in the additional audio signals 110*d*. In some embodiments, other score based statistics, besides summation, may be used as an indication of parameter quality.

The reverberation parameter selection circuit 502 may then select the next trial set of parameters from the population, and the process described above is repeated to generate another scoring statistic (e.g., summation of scores) for that parameter set. The process continues until all desired parameters sets have been similarly scored.

The reverberation model selection circuit 506 is configured to generate operational reverberation models, each model employing a trial set of reverberation parameters selected based on the scoring statistic. For example the top M scoring trial parameter sets may be assigned as operational parameter sets for M reverberation simulators.

In some embodiments, a parameter optimization circuit 508 is configured to generate an updated trial set of reverberation parameters for the reverberation simulator using an optimization algorithm based on the scoring statistics calculated over the employed trial sets of reverberation parameters. In this way, the reverberation parameter selection circuit may be guided in the choice of trial parameter sets, rather than sequentially searching through every possible set. In some embodiments, the optimization algorithm may be a genetic algorithm or a gradient descent algorithm, although other known optimization techniques, in light of the present disclosure, may be employed.

Methodology

Figure 6:
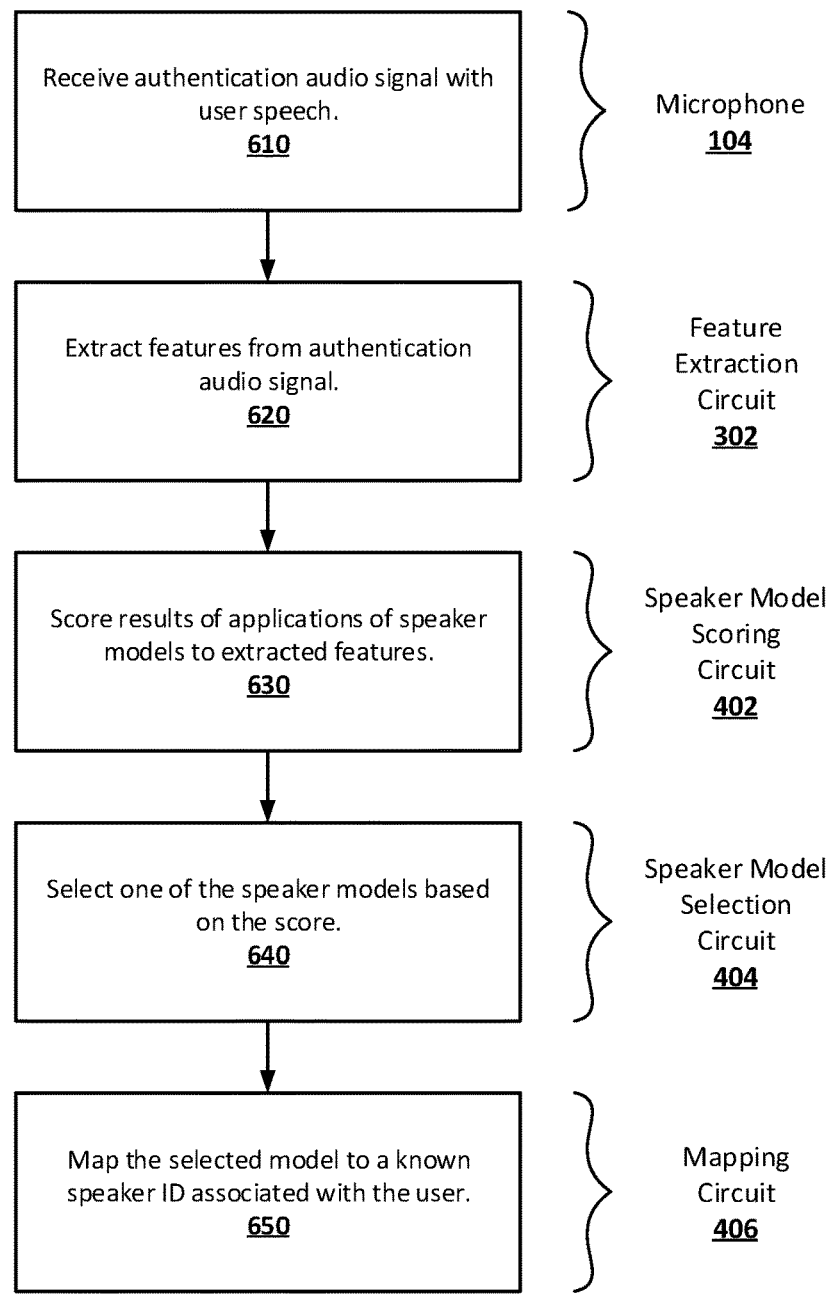
FIG. 6 is a flowchart illustrating a methodology for speaker recognition with reverberation compensation, in accordance with certain embodiments of the present disclosure.

FIG. 6 is a flowchart illustrating an example method 600 for speaker recognition with reverberation compensation, in accordance with certain embodiments of the present disclosure. As can be seen, example method 600 includes a number of phases and sub-processes, the sequence of which may vary from one embodiment to another. However, when considered in the aggregate, these phases and sub-processes form a process for speaker recognition in accordance with certain of the embodiments disclosed herein. These embodiments can be implemented, for example using the system architecture illustrated in FIGS. 3 and 4 as described above. However other system architectures can be used in other embodiments, as will be apparent in light of this disclosure. To this end, the correlation of the various functions shown in FIG. 6 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 600. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 6, in one embodiment, method 600 for speaker recognition with reverberation compensation commences by receiving, at operation 610, an authentication audio signal associated with speech of a user to be identified. The authentication audio signal may include any sort of utterance by the user and may be captured by a microphone in either the near-field or the far-field of the microphone.

Next, at operation 620, features are extracted from the authentication audio signal. The features may be any acoustic features of speech that may be used to distinguish between speakers. At operation 630, one or more speaker models are applied to the extracted features and the results are scored. The speaker models are trained on training audio signals, from a number of known and identified users, which are processed by a reverberation simulator to simulate a variety of far-field environmental effects to be associated with each speaker model. In some embodiments, the training audio signals from the various known users are captured within the environment in which the speaker recognition system is to be deployed. In this way, the models can more precisely represent the reverberation effect of the environment on the utterances of the known users. In any case, the models allow the correct speaker to be identified, and the robustness of the models can vary from one embodiment to the next.

At operation 640, one of the speaker models is selected based on the score. For example, the speaker model that results in the highest score may be selected. At operation 650, the selected speaker model is mapped to a known speaker ID that is to be associated with the now recognized user.

Figure 7:
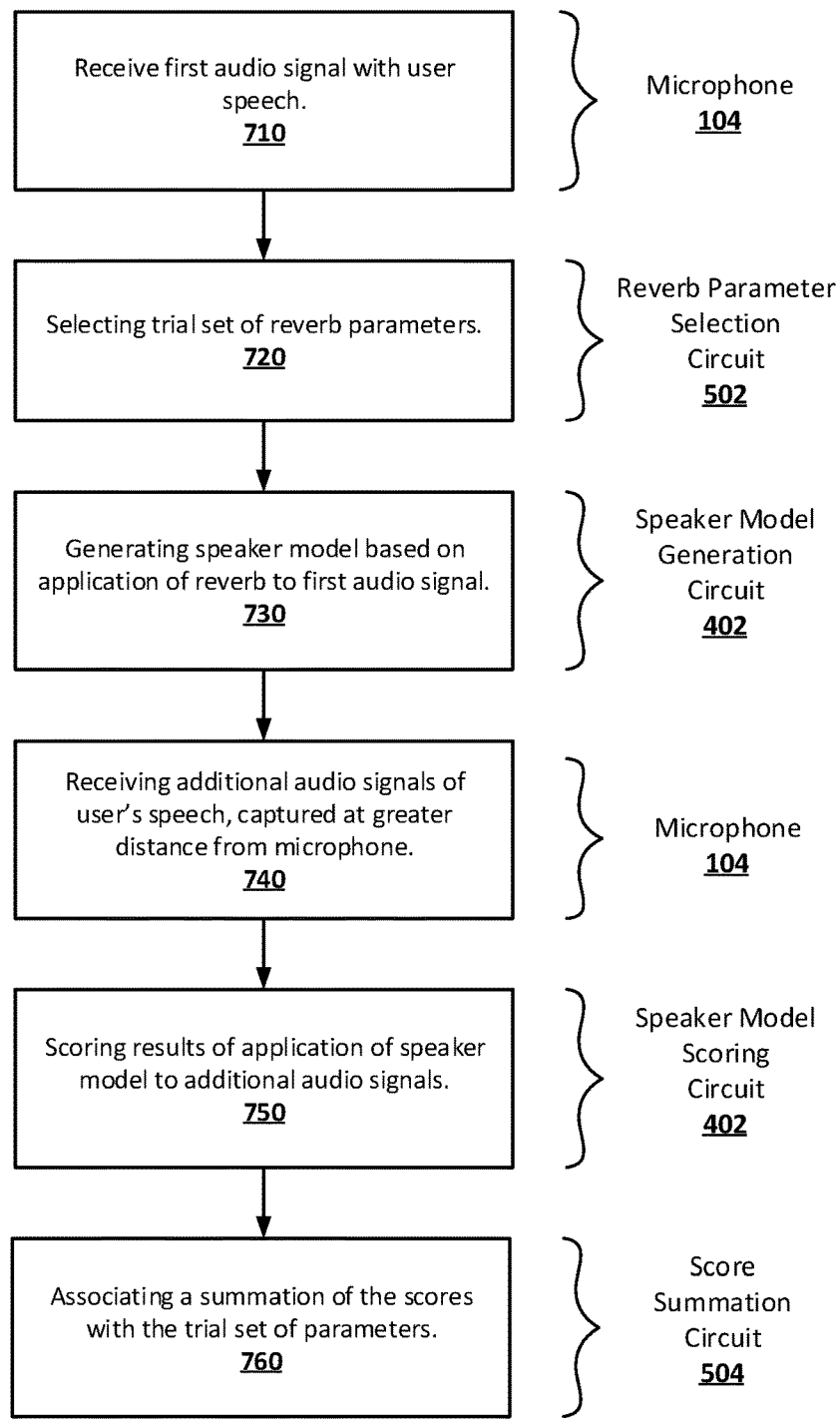
FIG. 7 is a flowchart illustrating a methodology for configuration of a reverberation simulator, in accordance with certain embodiments of the present disclosure.

FIG. 7 is a flowchart illustrating a methodology for configuration of a reverberation simulator, in accordance with certain embodiments of the present disclosure. As can be seen, example method 700 includes a number of phases and sub-processes, the sequence of which may vary from one embodiment to another. However, when considered in the aggregate, these phases and sub-processes form a process for configuration of a reverberation simulator in accordance with certain of the embodiments disclosed herein. These embodiments can be implemented, for example using the system architecture illustrated in FIG. 5 as described above. However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 700. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 7, in one embodiment, method 700 for configuration of a reverberation simulator commences by receiving, at operation 710, a first audio signal associated with speech of a user. In some embodiments, the first audio signal is the enrollment audio signal used in training. In some embodiments, the first audio signal may be captured in a near-field of the microphone.

Next, at operation 720, a trial set of parameters for the reverberation simulator is selected. At operation 730, the reverberation simulator is applied to the first audio signal, using the trial parameters, and features are extracted from the resulting signal. A speaker model is then generated, based those extracted features.

At operation 740, one or more additional audio signals, associated with speech of the same user as in operation 710 above, are received. These additional audio signals are captured in a far-field of the microphone and/or at a distance greater than the distance at which the first audio signal was captured. At operation 750, the speaker model is applied to extracted features of each of these additional audio signals and a score is generated for the results of each application. At operation 760, a summation of the scores is associated with the trial set of parameters.

Of course, in some embodiments, additional operations may be performed, as previously described in connection with the system. For example, the trial set of parameters may be selected as an operational set of parameters for the reverberation simulator based on the summation of scores associated with the trial set of parameters. Further additional operations may include generating an updated trial set of parameters for the reverberation simulator using an optimization algorithm based on the summation of scores. In some embodiments, the optimization algorithm may be a genetic algorithm or a gradient descent algorithm.

Example System

Figure 8:
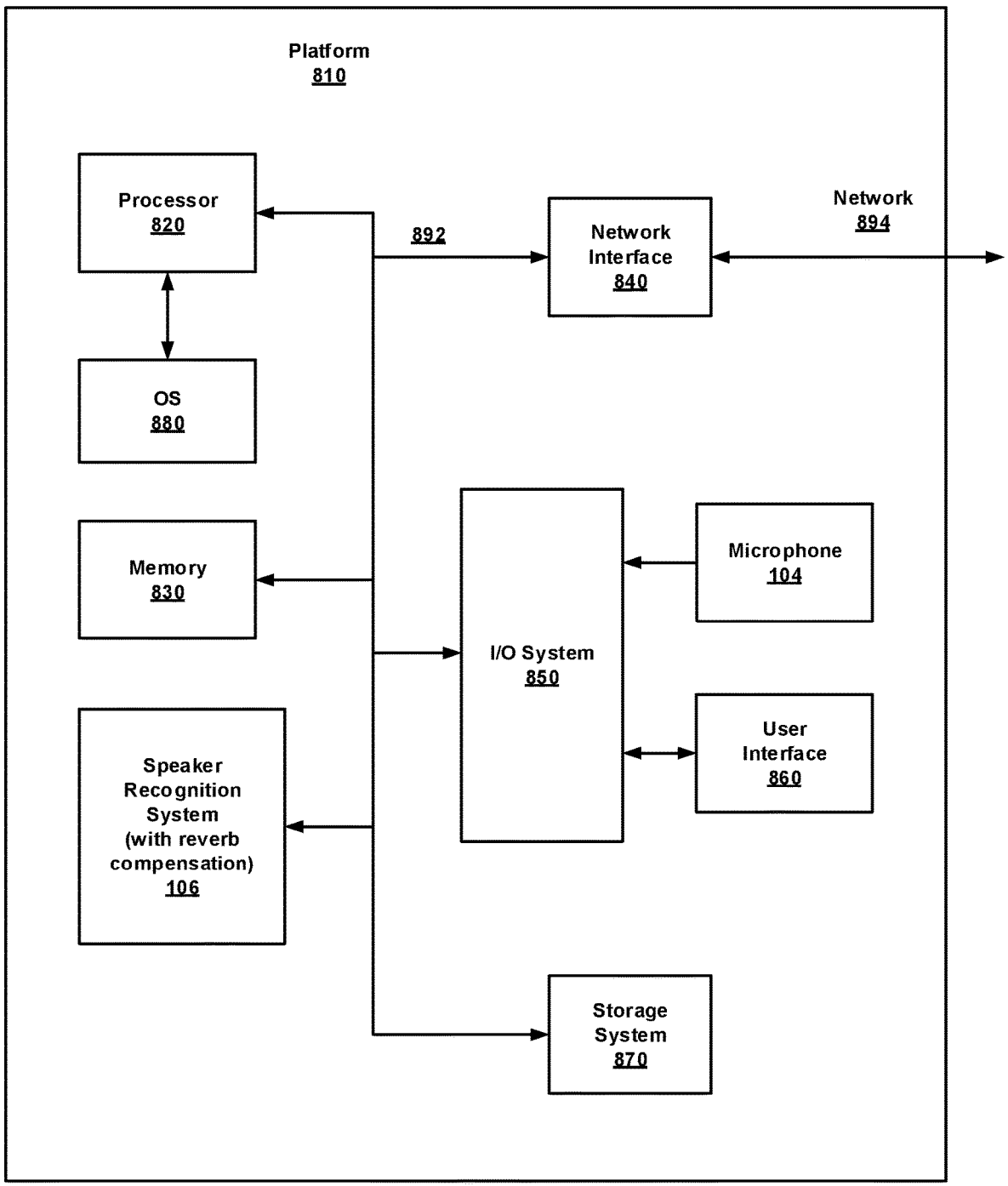
FIG. 8 is a block diagram schematically illustrating a system platform to perform speaker recognition with reverberation compensation, configured in accordance with certain embodiments of the present disclosure.

FIG. 8 illustrates an example system 800 to perform speaker recognition with reverberation compensation, configured in accordance with certain embodiments of the present disclosure. In some embodiments, system 800 comprises a platform 810 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 810 may comprise any combination of a processor 820, a memory 830, speaker recognition system 106, a network interface 840, an input/output (I/O) system 850, a microphone 104, a user interface 860 and a storage system 870. As can be further seen, a bus and/or interconnect 892 is also provided to allow for communication between the various components listed above and/or other components not shown. Platform 810 can be coupled to a network 894 through network interface 840 to allow for communications with other computing devices, platforms or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor or a graphics processing unit, to assist in control and processing operations associated with system 800. In some embodiments, the processor 820 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to a microphone 104, a user interface 860, and other devices not shown such as a keyboard, mouse, speaker, etc.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

Speaker recognition system 106 is configured to perform recognition of the identity of a speaker based on captured audio from either the near-field or the far-field of a microphone. The recognition is based on speaker models trained from audio samples, typically, but not necessarily, captured in the near-field of the microphone, and processed by a reverberation simulator to simulate selected far-field environmental effects. Speaker models trained in this manner, to include reverberation compensation, provide more accurate recognition performance over a greater range of environmental conditions and range of distances between the speaker and the microphone. Speaker recognition system 106 may include any or all of the components illustrated in FIGS. 1-5, as described above. Speaker recognition system 106 can be implemented or otherwise used in conjunction with a variety of suitable software and/or hardware that is coupled to or that otherwise forms a part of platform 810. Speaker recognition system 106 can additionally or alternatively be implemented or otherwise used in conjunction with user I/O devices that are capable of providing information to, and receiving information and commands from, a user. These I/O devices may include microphone 104, and other devices collectively referred to as user interface 860. In some embodiments, user interface 860 may include a textual input device such as a keyboard, and a pointer-based input device such as a mouse. Other input/output devices that may be used in other embodiments include a display element, touchscreen, a touchpad, and/or a speaker. Still other input/output devices can be used in other embodiments.

In some embodiments, speaker recognition system 106 may be installed local to system 800, as shown in the example embodiment of FIG. 8. Alternatively, system 800 can be implemented in a client-server arrangement wherein at least some functionality associated with these circuits is provided to system 800 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 894 or remotely coupled to network 894 by one or more other networks and/or communication channels. In some cases access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the speaker recognition methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. In other embodiments, the functionalities disclosed herein can be incorporated into other software applications, such as speech recognition applications, security and user identification applications, and/or other audio processing applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for speaker recognition. The method comprises: receiving an authentication audio signal associated with speech of a user; extracting features from the authentication audio signal; scoring results of application of one or more speaker models to the extracted features, wherein each of the speaker models is trained based on a training audio signal, the training audio signal processed by a reverberation simulator to simulate selected far-field environmental effects to be associated with the speaker model; selecting one of the speaker models based on the score; and mapping the selected speaker model to a known speaker identification (ID) associated with the user.

Example 2 includes the subject matter of Example 1, wherein the training of the speaker models further comprises: capturing a plurality of the training audio signals from a plurality of users; receiving a known speaker ID for each of the users; and processing each of the plurality of training audio signals by the reverberation simulator to generate a plurality of reverberation processed training audio signals for each of the training audio signals, wherein each of the reverberation processed training audio signals is associated with a unique far-field environmental effect.

Example 3 includes the subject matter of Examples 1 or 2, wherein the training of the speaker models further comprises: generating feature sets of extracted features from each of the training audio signals and from each of the reverberation processed training audio signals; generating speaker models based on each feature set; and assigning the associated known speaker ID with the generated speaker model.

Example 4 includes the subject matter of any of Examples 1-3, wherein the authentication audio signal is captured in a far-field of the microphone and the training audio signal is captured in a near-field of the microphone.

Example 5 includes the subject matter of any of Examples 1-4, wherein the far-field is a distance greater than three feet from the microphone and the near-field is a distance closer than three feet from the microphone.

Example 6 is a method for configuring a reverberation simulator for speaker recognition. The method comprises: receiving a first audio signal associated with speech of a user, the first audio signal captured at a first distance from a microphone; selecting a trial set of parameters for a reverberation simulator; generating a speaker model based on extracted features of an application of the reverberation simulator to the first audio signal; receiving one or more additional audio signals associated with speech of the user, the additional audio signals captured at a second distance from the microphone, the second distance greater than the first distance; scoring results of application of the speaker model to extracted features of each of the additional audio signals; and associating a summation of the scores with the trial set of parameters.

Example 7 includes the subject matter of Example 6, further comprising selecting the trial set of parameters as an operational set of parameters based on the summation of scores associated with the trial set of parameters.

Example 8 includes the subject matter of Examples 6 or 7, further comprising generating an updated trial set of parameters for the reverberation simulator using an optimization algorithm based on the summation of scores.

Example 9 includes the subject matter of any of Examples 6-8, wherein the optimization algorithm is one of a genetic algorithm or a gradient descent algorithm.

Example 10 includes the subject matter of any of Examples 6-9, wherein the reverberation simulator is a Schroeder reverberator and the reverberation parameters comprise one or more of an effect mix parameter, a room size parameter, a damping parameter, and a stereo width parameter.

Example 11 includes the subject matter of any of Examples 6-10, wherein the second distance is in the far-field of the microphone and the first distance is in the near-field of the microphone.

Example 12 is at least one non-transitory computer readable storage medium having instructions encoded thereon that, when executed by one or more processors, result in the following operations for speaker recognition. The operations comprise: receiving an authentication audio signal associated with speech of a user; extracting features from the authentication audio signal; scoring results of application of one or more speaker models to the extracted features, wherein each of the speaker models is trained based on a training audio signal, the training audio signal processed by a reverberation simulator to simulate selected far-field environmental effects to be associated with the speaker model; selecting one of the speaker models based on the score; and mapping the selected speaker model to a known speaker identification (ID) associated with the user.

Example 13 includes the subject matter of Example 12, wherein the training of the speaker models further comprises the operations: capturing a plurality of the training audio signals from a plurality of users; receiving a known speaker ID for each of the users; and processing each of the plurality of training audio signals by the reverberation simulator to generate a plurality of reverberation processed training audio signals for each of the training audio signals, wherein each of the reverberation processed training audio signals is associated with a unique far-field environmental effect.

Example 14 includes the subject matter of Examples 12 or 13, wherein the training of the speaker models further comprises the operations: generating feature sets of extracted features from each of the training audio signals and from each of the reverberation processed training audio signals; generating speaker models based on each feature set; and assigning the associated known speaker ID with the generated speaker model.

Example 15 includes the subject matter of any of Examples 12-14, wherein the authentication audio signal is captured in a far-field of the microphone and the training audio signal is captured in a near-field of the microphone.

Example 16 includes the subject matter of any of Examples 12-15, wherein the far-field is a distance greater than three feet from the microphone and the near-field is a distance closer than three feet from the microphone.

Example 17 is at least one non-transitory computer readable storage medium having instructions encoded thereon that, when executed by one or more processors, result in the following operations for configuring a reverberation simulator for speaker recognition. The operations comprise: receiving a first audio signal associated with speech of a user, the first audio signal captured at a first distance from a microphone; selecting a trial set of parameters for a reverberation simulator; generating a speaker model based on extracted features of an application of the reverberation simulator to the first audio signal; receiving one or more additional audio signals associated with speech of the user, the additional audio signals captured at a second distance from the microphone, the second distance greater than the first distance; scoring results of application of the speaker model to extracted features of each of the additional audio signals; and associating a summation of the scores with the trial set of parameters.

Example 18 includes the subject matter of Example 17, the operations further comprising selecting the trial set of parameters as an operational set of parameters based on the summation of scores associated with the trial set of parameters.

Example 19 includes the subject matter of Examples 17 or 18, the operations further comprising generating an updated trial set of parameters for the reverberation simulator using an optimization algorithm based on the summation of scores.

Example 20 includes the subject matter of any of Examples 17-19, wherein the optimization algorithm is one of a genetic algorithm or a gradient descent algorithm.

Example 21 includes the subject matter of any of Examples 17-20, wherein the reverberation simulator is a Schroeder reverberator and the reverberation parameters comprise one or more of an effect mix parameter, a room size parameter, a damping parameter, and a stereo width parameter.

Example 22 includes the subject matter of any of Examples 17-21, wherein the second distance is in the far-field of the microphone and the first distance is in the near-field of the microphone.

Example 23 is a system for speaker recognition. The system comprises: a feature extraction circuit to extract features from a received authentication audio signal associated with speech of a user; a speaker model scoring circuit to score results of application of one or more speaker models to the extracted features, wherein each of the speaker models is trained based on a training audio signal, the training audio signal processed to simulate selected far-field environmental effects to be associated with the speaker model; a speaker model selection circuit to select one of the speaker models based on the score; and a mapping circuit to map the selected speaker model to a known speaker identification (ID) associated with the user.

Example 24 includes the subject matter of Example 23, further comprising a speaker model training circuit, the training circuit comprising: a reverberation simulator circuit to generate a plurality of processed training audio signals based on the captured training audio signal, each processed training audio signal to simulate a unique far-field environmental effect; the feature extraction circuit further to generate a feature set of extracted features for the captured training audio signal and each of the processed training audio signals; and a speaker model generation circuit to generate a plurality of speaker models associated with the speaker ID, each of the speaker models based on one of the feature sets.

Example 25 includes the subject matter of Examples 23 or 24, wherein the speaker model training circuit is further to process training audio signals from a plurality of users and to generate a plurality of speaker models for each of the users.

Example 26 includes the subject matter of any of Examples 23-25, wherein the authentication audio signal is captured in a far-field of the microphone and the training audio signal is captured in a near-field of the microphone.

Example 27 includes the subject matter of any of Examples 23-26, wherein the far-field is a distance greater than three feet from the microphone and the near-field is a distance closer than three feet from the microphone.

Example 28 is a system for configuring a reverberation simulator for speaker recognition. The system comprises: a reverberation simulator circuit to add reverberation to a user provided first audio signal, captured at a first distance from a microphone, to generate a processed audio signal that simulates a far-field environmental effect, the reverberation based on a trial set of reverberation parameters; a feature extraction circuit to extract features from the processed audio signal; a speaker model generation circuit to generate a speaker model based on the extracted features; the feature extraction circuit further to extract features from one or more additional audio signals associated with speech of the user, the additional audio signals captured at a second distance from the microphone, the second distance greater than the first distance; a speaker model scoring circuit to score results of application of the speaker model to the extracted features of each of the additional audio signals; and a score summation circuit to associate a summation of the scores with the trial set of reverberation parameters.

Example 29 includes the subject matter of Example 28, further comprising a reverberation model selection circuit to assign the trial set of reverberation parameters as an operational set of reverberation parameters based on the summation of scores associated with the trial set of reverberation parameters.

Example 30 includes the subject matter of Examples 28 or 29, further comprising a parameter optimization circuit to generate an updated trial set of reverberation parameters for the reverberation simulator using an optimization algorithm based on the summation of scores.

Example 31 includes the subject matter of any of Examples 28-30, wherein the optimization algorithm is one of a genetic algorithm or a gradient descent algorithm.

Example 32 includes the subject matter of any of Examples 28-31, wherein the reverberation simulator circuit is a Schroeder reverberator and the reverberation parameters comprise one or more of an effect mix parameter, a room size parameter, a damping parameter, and a stereo width parameter.

Example 33 includes the subject matter of any of Examples 28-32, wherein the second distance is in the far-field of the microphone and the first distance is in the near-field of the microphone.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. At least one storage device comprising instructions that, when executed, cause at least one processor to at least:
    generate a room configuration based on prior knowledge, the room configuration including a room size;
    simulate a plurality of far-field utterances based on the room configuration, a reverberation parameter, and a source utterance; and
    train a model to recognize speech within a room based on the simulated plurality of far-field utterances.

2. The at least one storage device of claim 1, wherein the source utterance is a single channel utterance.

3. The at least one storage device of claim 1, wherein the instructions, when executed, cause the at least one processor to store the model in storage.

4. The at least one storage device of claim 1, wherein the instructions, when executed, cause the at least one processor to:
    access spoken audio; and
    utilize the model to identify a speaker based on the accessed audio.

5. The at least one storage device of claim 4, wherein the instructions, when executed, cause the at least one processor to utilize the model without removal of reverberation from the accessed audio.

6. The at least one storage device of claim 1, wherein the model is a first model and the instructions, when executed, cause the at least one processor to:
    access spoken audio;
    utilize the first model to generate a first score associated with a first speaker based on the accessed audio;
    utilize a second model to generate a second score associated with a second speaker based on the accessed audio; and
    select one of the first speaker or the second speaker based on the first score and the second score.

7. The at least one storage device of claim 1, wherein the source utterance corresponds to an identified speaker.

8. An apparatus comprising:
    a microphone;
    memory;
    one or more storage devices;
    a network interface circuit;
    at least one processor to execute machine-readable instructions to:
        generate a room configuration based on prior knowledge, the room configuration including a room size;
        simulate a plurality of noisy far-field utterances based on the room configuration, a reverberation parameter, and a source utterance; and
        train a model to recognize speech within a room based on the simulated plurality of noisy far-field utterances.

9. The apparatus of claim 8, wherein the source utterance is a single channel utterance.

10. The apparatus of claim 8, wherein the at least one processor is to store the model in the memory.

11. The apparatus of claim 8, wherein the at least one processor is to:
   access spoken audio via the microphone; and
   utilize the model to identify a speaker based on the accessed audio.

12. The apparatus of claim 11, wherein the at least one processor is to utilize the model without removal of reverberation from the accessed audio.

13. The apparatus of claim 8, wherein the model is a first model and the at least one processor is to:
   access spoken audio via the microphone;
   generate a first score associated with a first speaker based on the first model and the accessed audio;
   generate a second score associated with a second speaker based on the accessed audio and a second model; and
   select one of the first speaker or the second speaker based on the first score and the second score.

14. The apparatus of claim 8, wherein the source utterance corresponds to an identified speaker.

15. The apparatus of claim 14, wherein the at least one processor is to utilize the model to verify the identified speaker.

16. A system to perform speech recognition in a room, the system comprising:
   a simulator configuration circuit to generate a room configuration based on prior knowledge, the room configuration to include a room size;
   a reverb simulator circuit to simulate a plurality of noisy far-field utterances based on the room configuration, a reverberation parameter, and a source utterance; and
   a training circuit to train a model to recognize speech within the room based on the simulated plurality of noisy far-field utterances.

17. The apparatus of claim 8, further including a display.

18. The apparatus of claim 8, further including an audio output component.

19. The system of claim 16, wherein the source utterance is a single channel utterance.

20. The system of claim 16, further including a memory, wherein the training circuit is to store the model in the memory.

21. The system of claim 16, further including a recognition circuit to identify a user based on spoken audio of the user, and the model.

22. The system of claim 21, wherein the recognition circuit does not remove reverberation from the accessed audio.

* * * * *